United States Patent
Zhang

(10) Patent No.: US 10,362,283 B2
(45) Date of Patent: Jul. 23, 2019

(54) VIRTUAL CINEMA AND IMPLEMENTATION METHOD THEREOF

(71) Applicant: Beijing Pico Technology Co., Ltd., Beijing (CN)

(72) Inventor: Ruisheng Zhang, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 145 days.

(21) Appl. No.: 15/211,671

(22) Filed: Jul. 15, 2016

(65) Prior Publication Data

US 2017/0195646 A1    Jul. 6, 2017

(30) Foreign Application Priority Data

Dec. 31, 2015 (CN) .......................... 2015 1 1026692

(51) Int. Cl.
*H04N 9/31* (2006.01)
*G06T 19/00* (2011.01)

(52) U.S. Cl.
CPC ......... *H04N 9/3179* (2013.01); *G06T 19/006* (2013.01)

(58) Field of Classification Search
CPC .................................................. H04N 9/3179
USPC ........................................................ 348/744
See application file for complete search history.

(56) References Cited

U.S. PATENT DOCUMENTS

2003/0128337 A1* 7/2003 Jaynes ................... G03B 21/26
353/30
2006/0268180 A1* 11/2006 Chou ....................... G06T 5/009
348/673
2010/0201878 A1* 8/2010 Barenbrug ......... H04N 5/44591
348/563
2014/0080638 A1* 3/2014 Feng .................... A63B 69/002
473/439
2014/0333660 A1* 11/2014 Ballestad ................ G09G 5/00
345/593
2016/0044298 A1* 2/2016 Holz ..................... H04N 5/332
348/47

FOREIGN PATENT DOCUMENTS

CN    104185087 A    12/2014

OTHER PUBLICATIONS

Office action from Chinese Application No. 201511026692.8 dated Feb. 14, 2018 (6 pages).

* cited by examiner

*Primary Examiner* — Jefferey F Harold
*Assistant Examiner* — Justin B Sanders
(74) *Attorney, Agent, or Firm* — Harness, Dickey & Pierce, P.L.C.

(57) ABSTRACT

The present disclosure discloses a virtual cinema and an implementation method thereof. The implementation method of the virtual cinema comprises: arranging a virtual screen, and playing a video content thereon; and projecting ambient light varying with the video content around the virtual screen. By projecting ambient light varying with the video content around the virtual screen while displaying the video content to the user through the virtual screen, the sense of reality is enhanced, thereby solving the problem that the user experience is affected because the ambient light is not considered enough in the existed virtual cinema.

4 Claims, 2 Drawing Sheets

VIRTUAL CINEMA AND IMPLEMENTATION METHOD THEREOF

CROSS-REFERENCE TO RELATED APPLICATION

This application claims the benefit and priority to Chinese Application Number 201511026692.8 filed Dec. 31, 2015. The entire disclosure of the above application is incorporated herein by reference.

FIELD

The present disclosure relates to the technical field of virtual realities, and particularly, to a virtual cinema and an implementation method thereof.

BACKGROUND

This section provides background information related to the present disclosure which is not necessarily prior art.

With the gradual maturity of the virtual reality technique, watching films in a virtual cinema becomes an important part of the virtual reality application. The virtual cinema is also referred to as virtual reality player, which enables a user to feel like watching films in a real cinema. For this purpose, the ambient light varying with the screen light is indispensable. But currently, there is no case where the ambient light is added to the virtual cinema, thus the user of the virtual cinema feels that the film watching effect is not real enough, and the user experience is degraded.

SUMMARY

This section provides a general summary of the disclosure, and is not a comprehensive disclosure of its full scope or all of its features.

In order to solve the above problem, the present disclosure provides a virtual cinema and an implementation method thereof.

According to one aspect of the present disclosure, an implementation method of a virtual cinema is provided, comprising:

arranging a virtual screen, and playing a video content thereon; and projecting ambient light varying with the video content around the virtual screen.

Wherein, the method further comprises:

obtaining data of each frame of image of the video content in real time, in a process of playing the video content on the virtual screen; and obtaining ambient light data corresponding to the data of each frame of image in real time according to the obtained data of each frame of image.

Wherein, obtaining ambient light data corresponding to the data of each frame of image in real time according to the obtained data of each frame of image comprises:

performing a Gaussian blur algorithm for the data of each frame of image to process the data of each frame of image into data only including colors, which serves as the ambient light data.

Wherein, the method arranges the virtual screen using Unity3D or OpenGL technique, and projects ambient light varying with the video content around the virtual screen.

Wherein, the method is applicable to a virtual reality device, an enhanced reality device and an ordinary video player.

According to another aspect of the present disclosure, a virtual cinema is provided, comprising a virtual screen and a projection module;

the virtual screen is configured to play a video content; and the projection module is configured to project ambient light varying with the video content around the virtual screen.

Wherein, the virtual cinema further comprises an ambient light obtaining module;

the ambient light obtaining module is connected to the virtual screen and the projection module, respectively, and configured to obtain data of each frame of image played by the virtual screen in real time, obtain ambient light data corresponding to the data of each frame of image in real time according to the data of each frame of image, and transmit the ambient light data to the projection module.

Wherein, the ambient light obtaining module is specifically configured to:

perform a Gaussian blur algorithm for the data of each frame of image to process the data of each frame of image into data only including colors, which serves as the ambient light data.

Wherein, the virtual cinema implements the virtual screen and the projection module by using Unity3D or OpenGL technique.

Wherein, the virtual cinema is applicable to a virtual reality device, an enhanced reality device and an ordinary video player.

The embodiment of the present disclosure has the following beneficial effect: by projecting ambient light varying with the video content around the virtual screen while displaying the video content to the user through the virtual screen, the sense of reality is enhanced and the user experience is improved. In the preferred embodiment, by obtaining ambient light varying with the played video content in real time according to the video content played by the virtual screen, the ambient effect is vivid, and it is unnecessary to preprocess the video, thereby saving the resources.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
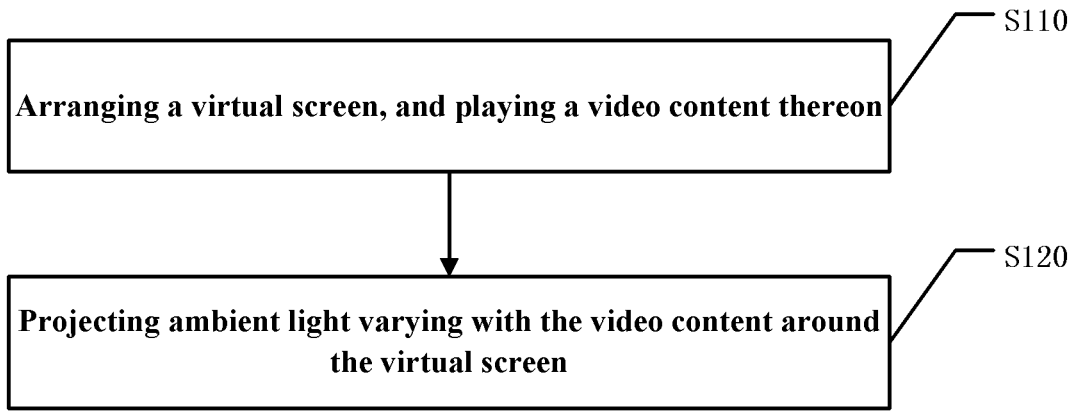
FIG. 1 is a flow diagram of an implementation method of a virtual cinema provided by an embodiment of the present disclosure.

FIG. 1 is a flow diagram of an implementation method of a virtual cinema provided by an embodiment of the present disclosure. As illustrated in FIG. 1, the implementation method of the virtual cinema provided by the embodiment of the present disclosure comprises:

step S110: arranging a virtual screen, and playing a video content thereon;

step S120: projecting ambient light varying with the video content around the virtual screen.

By using the implementation method of the virtual cinema provided by the embodiment of the present disclosure, when a film is watched in the virtual cinema, the ambient light varies with the played video content, i.e., the light around may be dimmed or brightened along with the image switching on the virtual screen, thus a person feels like watching the film in a real cinema, and the user experience is improved.

Preferably, the ambient light in "step S120: projecting ambient light varying with the video content around the virtual screen" is obtained in the steps of:

obtaining data of each frame of image of the video content in real time, in a process of playing the video content on the virtual screen; and obtaining ambient light data corresponding to the data of each frame of image in real time according to the obtained data of each frame of image.

In this embodiment, the ambient light is obtained in real time according to the played video content, and there is no requirement about the video data, i.e., the video itself is not required to carry any ambient light data. Thus by using the implementation method of the virtual cinema provided by the embodiment of the present disclosure, ambient light varying with the video content can be added while playing any ordinary video, thereby improving the user experience.

Further, obtaining ambient light data corresponding to the data of each frame of image in real time according to the obtained data of each frame of image is to perform a Gaussian blur algorithm for the data of each frame of image to process the data of each frame of image into data only including colors, which serves as the ambient light data.

The Gaussian blur is also referred to as Gaussian smoothing, which is widely used in the image processing and can effectively reduce image noises and degrade the detail level. The Gaussian blur algorithm can count the pixel color values around a certain point in a Gaussian curve, and obtain a color value of the curve in a weighted average calculation method. The Gaussian blur algorithm is performed for the data of each frame of image to process the data of each frame of image into ambient data only including colors. Next, the obtained ambient light data is projected around the virtual screen to achieve a lighting effect. The ambient light data obtained after the Gaussian blur comes from the virtual screen, thus the ambient effect is vivid while varying with the video content, which immerses the user in the virtual cinema and improves the user experience.

Figure 2:
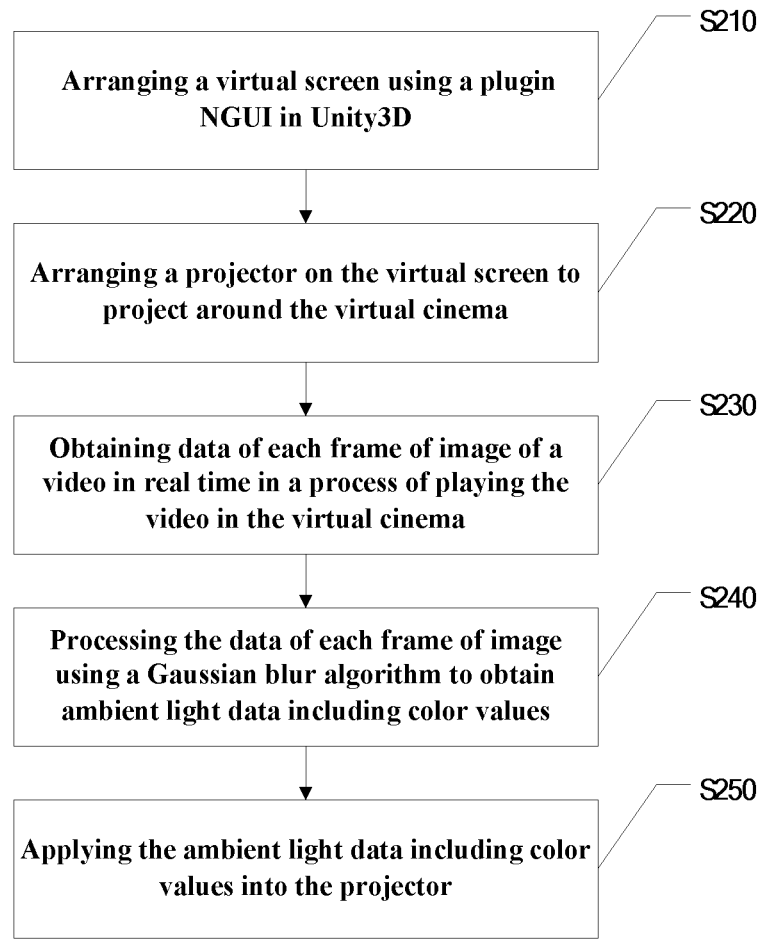
FIG. 2 is a flow diagram of an implementation method of a virtual cinema provided by a preferred embodiment of the present disclosure.

FIG. 2 is a flow diagram of an implementation method of a virtual cinema provided by a preferred embodiment of the present disclosure. In the implementation method of the virtual cinema provided by the present disclosure, a virtual screen may be arranged using techniques such as Unity3D or OpenGL, and ambient light varying with the video content may be projected around the virtual screen. As illustrated in FIG. 2, an implementation method of a virtual cinema provided by a preferred embodiment of the present disclosure comprises:

Step S210: arranging a virtual screen using a plugin NGUI in Unity3D. The NGUI provides a strong UI system and an event notification framework, and it has concise codes, simple operations and high performances.

Step S220: arranging a projector on the virtual screen to project around the virtual cinema. The Unity3D provides a projector component, and a material can be projected to a scene by the projector.

Step S230: obtaining data of each frame of image of a video in real time in a process of playing the video in the virtual cinema.

Step S240: processing the data of each frame of image using a Gaussian blur algorithm to obtain data only including colors. The Gaussian blur algorithm can count the pixel color values around a certain point in a Gaussian curve, and obtain a color value of that curve in a weighted average calculation method.

Step S250: applying the data only including colors in step S240 into the projector which projects ambient light of corresponding colors around the virtual screen; when a frame of image varies, a different color value is obtained, and then different ambient light is projected, thus ambient light varying with the video content is obtained.

The implementation method of a virtual cinema provided by the present disclosure is particularly suitable to the virtual reality device. Ambient light varying with screen light is added into the virtual cinema, and the ambient light around each frame of picture varies with that picture, which enables a user to feel like watching films in a real cinema, thereby enhancing the sense of reality and improving the user experience. In addition, the implementation method of a virtual cinema provided by the present disclosure is also suitable for an enhanced reality device and an ordinary video player.

Figure 3:
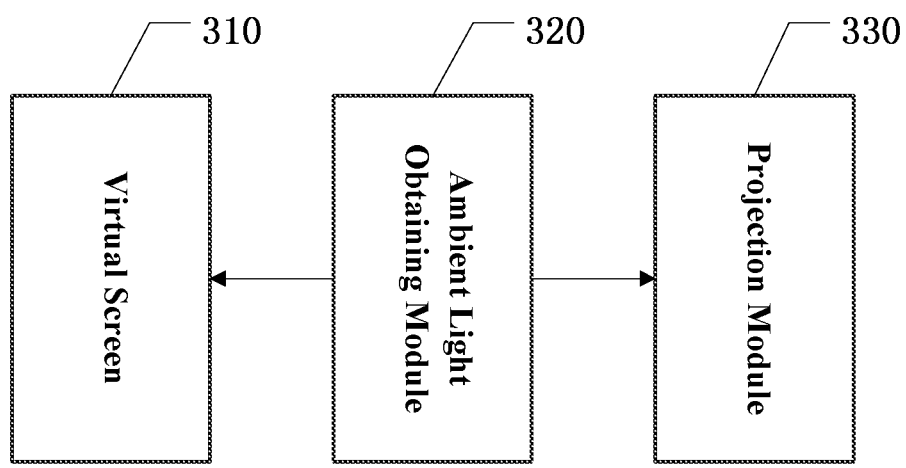
FIG. 3 is a system structure diagram of a virtual cinema provided by a preferred embodiment of the present disclosure.

FIG. 3 is a system structure diagram of a virtual cinema provided by a preferred embodiment of the present disclosure. As illustrated in FIG. 3, the virtual cinema provided by the embodiment of the present disclosure comprises a virtual screen 310 and a projection module 330.

The virtual screen 310 is configured to play a video content. It is corresponding to a screen of a real cinema, and a user can watch the video content such as a film through the virtual screen 310.

The projection module 330 is configured to project ambient light varying with the video content around the virtual screen 310.

The existed virtual cinema usually plays a video within the entire range of visibility of the user, or within a part of the range of visibility of the user without displaying any content in other parts. When watching a film in a real cinema, people will see ambient light projected from the screen to the wall, ground, etc. in addition to the content presented on the screen. While the ambient light is not considered in the existed virtual cinema, and the sense of reality is weakened. The virtual cinema provided by the embodiment of the present disclosure plays the video content using the virtual screen 310 which only occupies a part of the range of visibility of the user, usually the middle part, and the projection module 330 projects ambient light varying with the video content around the virtual screen 310, i.e., in other parts of the range of visibility of the user, so that the user experiences a film watching in a real cinema.

The virtual cinema provided by a preferred embodiment of the present disclosure further comprises an ambient light obtaining module 320 connected to the virtual screen 310 and the projection module 330, respectively. Firstly, the ambient light obtaining module 320 obtains data of each frame of image played by the virtual screen 310 in real time, then obtains ambient light data corresponding to the data of each frame of image in real time according to the data of each frame of image, and finally transmits the ambient light data to the projection module 330 which projects ambient light varying with the video content around the virtual screen 310. The ambient light is obtained by the ambient light obtaining module 320 in real time according to the content played by the virtual screen 310, thus it is unnecessary to preprocess the played video, and ambient light varying with the video content can be obtained when any ordinary video is played by the virtual cinema.

Preferably, the ambient light obtaining module 320 performs a Gaussian blur algorithm for the data of each frame of image, counts the pixel color values around a certain point in a Gaussian curve, and obtains a color value of that curve in a weighted average calculation method. It processes the data of each frame of image into ambient data only including colors, and then projects the obtained ambient light data only including colors around the virtual screen to achieve a lighting effect. The ambient light data comes from the virtual screen 310, thus the ambient effect is vivid while varying with the video content.

Further preferably, the virtual screen 310 and the projection module 330 are implemented using the technique such as Unity3D or OpenGL. For example, the virtual screen 310 may be arranged using a plugin NGUI in Unity3D, and the projection module 330 may be implemented using the projector component provided by Unity3D.

The virtual cinema provided by the present disclosure is applicable to the virtual reality device, the enhanced reality device and the ordinary video player, and particularly suitable to the virtual reality device, thereby enabling a user to feel like staying in a real scene.

In conclusion, a virtual cinema and an implementation method thereof provided by the present disclosure have the following beneficial effects as compared with the prior art:

1. The virtual cinema provided by the present disclosure projects ambient light varying with the video content around the virtual screen while displaying the video content to the user through the virtual screen, thereby enhancing the sense of reality and improving the user experience.

2. The virtual cinema provided by the present disclosure obtains ambient light varying with the played video content in real time according to the video content played by the virtual screen, thus the ambient effect is vivid, and it is unnecessary to preprocess the video, thereby saving the resources.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An implementation method of a virtual cinema, the implementation method applicable to a virtual reality device, the implementation method comprising:
    arranging a virtual screen with a Unity3D technique;
    providing a projector on the virtual screen and setting a direction of the projector to project around the virtual screen, via a projector component provided by Unity3D;
    playing video content on the virtual screen;
    obtaining data of each frame of image of the video content in real time when the video content is playing on the virtual screen;
    obtaining ambient light data corresponding to the obtained data of each frame of image in real time;
    applying the obtained ambient light data to the projector; and
    projecting, via the projector, ambient light that varies with the video content around the virtual screen.

2. The implementation method of a virtual cinema according to claim 1, wherein obtaining ambient light data comprises performing a Gaussian blur algorithm to process the data of each frame of image into data including only colors, which serves as the ambient light data.

3. A virtual cinema applicable to a virtual reality device, the virtual cinema comprising a virtual screen, an ambient light obtaining module, and a projection module, the virtual screen arranged with a Unity3D technique and configured to play a video content, the ambient light obtaining module connected to the virtual screen and the projection module, the ambient light obtaining module configured to obtain data of each frame of image played by the virtual screen in real time, obtain ambient light data corresponding to the obtained data of each frame of image played by the virtual screen in real time, and transmit the obtained ambient light data to the projection module, and the projection module implemented using a projector component provided by Unity3D and configured to provide a projector on the virtual screen, set a direction of the projector to project around the virtual screen, and apply the obtained ambient light data to the projector, the projector configured to project ambient light that varies with the video content around the virtual screen.

4. The virtual cinema according to claim 3, wherein the ambient light obtaining module is configured to perform a Gaussian blur algorithm to process the data of each frame of image into data including only colors, which serves as the ambient light data.

* * * * *